United States Patent
Guerra et al.

(10) Patent No.: US 9,845,108 B2
(45) Date of Patent: Dec. 19, 2017

(54) SYSTEMS AND METHODS FOR ESTIMATING STEERING ASSISTANCE

(71) Applicant: FORD GLOBAL TECHNOLOGIES, LLC, Dearborn, MI (US)

(72) Inventors: Joshua Guerra, Farmington Hills, MI (US); Lodewijk Wijffels, Canton, MI (US); Oliver Nehls, Düsseldorf (DE); Joseph Park, St. Clair Shores, MI (US); Timothy Cannon, Millington, MI (US); Sergio Codonesu, Heerlen (NL); Jan Bremkens, Straelen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 58 days.

(21) Appl. No.: 14/921,506

(22) Filed: Oct. 23, 2015

(65) Prior Publication Data

US 2017/0113714 A1   Apr. 27, 2017

(51) Int. Cl.
*B62D 5/04* (2006.01)
*B62D 6/10* (2006.01)
*G07C 5/00* (2006.01)

(52) U.S. Cl.
CPC ......... *B62D 5/0463* (2013.01); *B62D 5/0481* (2013.01); *B62D 6/10* (2013.01); *G07C 5/006* (2013.01)

(58) Field of Classification Search
CPC ...... B62D 5/0463; B62D 5/0481; B62D 6/10; G07C 5/006

USPC .......................................................... 701/41
See application file for complete search history.

(56) References Cited

U.S. PATENT DOCUMENTS

| | | | |
|---|---|---|---|
| 5,307,892 A * | 5/1994 | Phillips | B62D 5/09 180/422 |
| 6,519,518 B1 | 2/2003 | Klein et al. | |
| 7,210,554 B2 | 5/2007 | Sugiyama et al. | |
| 8,121,760 B2 * | 2/2012 | Ghoneim | B62D 5/008 701/42 |
| 8,676,445 B2 | 3/2014 | Offerle et al. | |
| 2012/0265403 A1 * | 10/2012 | Svensson | B60K 31/0008 701/41 |
| 2016/0159348 A1 * | 6/2016 | Lavoie | B60W 10/18 701/41 |

FOREIGN PATENT DOCUMENTS

| | | | | |
|---|---|---|---|---|
| CN | 103481943 A | 1/2014 | | |
| JP | EP1995150 A2 * | 11/2008 | ......... | B62D 5/0463 |
| JP | EP1213204 A2 * | 6/2012 | ......... | B62D 5/0463 |
| KR | 101031057 B1 | 4/2011 | | |

* cited by examiner

*Primary Examiner* — Marthe Marc-Coleman
(74) *Attorney, Agent, or Firm* — Jones Robb, PLLC; Raymond L. Coppiellie

(57) ABSTRACT

A method for estimating steering assistance provided by a power steering system of a vehicle may include correlating an internal torque applied by an adaptive steering system of the vehicle with an external torque applied to a steering assembly of the vehicle. The method may also include estimating the steering assistance based on the correlation.

25 Claims, 6 Drawing Sheets

SYSTEMS AND METHODS FOR ESTIMATING STEERING ASSISTANCE

TECHNICAL FIELD

The present disclosure relates generally to systems and methods for estimating steering assistance. In particular, the present disclosure relates to systems and methods for estimating a change in steering assistance provided by a power steering system of a motor vehicle.

BACKGROUND

Motor vehicles may provide steering assistance to amplify a force or torque applied by a driver of the vehicle (i.e., at a steering wheel) to the steering assembly of the vehicle. Vehicles, for example, generally have either electric power assisted steering (EPAS) or hydraulic power steering. Hydraulic power steering, for example, relies on pistons in the steering rack with pressurized fluid to provide steering assistance, while EPAS does away with the hydraulic pistons and instead uses a simple motor to help push the steering rack as the driver turns the steering wheel.

Vehicles with power steering systems may also be equipped with adaptive steering systems, such as, for example, adaptive front steering (AFS) systems. Adaptive steering systems may, for example, continuously and intelligently alter the relationship between a driver's steering inputs at the steering wheel and the angle of the steered road wheels of the vehicle. An adaptive steering system, for example, varies the degree that the road wheels turn in response to rotation of the steering wheel via a mechatronic auxiliary system. At lower speeds, this technology may reduce the amount that the steering wheel must be turned (improving performance in situations such as parking and other urban area traffic maneuvers), and at higher speeds, the system helps to prevent increased steering responsiveness resulting from increased speeds (providing improved direction stability).

Adaptive steering systems may, therefore, be used to adjust a rotation angle in the steering assembly in response to a vehicle's operating conditions. For example, an adaptive steering controller may receive data regarding the vehicle's operating conditions and adjust the angle applied by the driver (i.e., the angle provided by the driver at the steering wheel). This adjustment is generally referred to as an overlay angle, and represents the difference between the angle at the steering wheel (i.e., the driver input angle) and the angle of the steered road wheels (i.e., the angle of the rod coupled to the wheels). When steering assistance degrades, however, the torque required to achieve the desired overlay angle may increase.

In vehicles with an EPAS system, the EPAS system is generally configured to continuously propagate a system status to the adaptive steering system. With this information, the adaptive steering system can properly react, for example, to a system degradation to provide an optimal overlay angle. Vehicles with hydraulic power steering systems, however, generally do not have the capability to provide feedback to the adaptive steering system regarding the system's status (e.g., that assist is limited), which may reduce the availability of the adaptive steering system (i.e., the capability of the adaptive steering system to provide the overlay angle).

It may, therefore, be advantageous to provide systems and methods that may detect the status of both types of power steering systems. It may be further advantageous to provide systems and methods that may estimate an amount of change in the steering assistance provided by such systems, and compensate for the change accordingly.

SUMMARY

In accordance with various exemplary embodiments of the present disclosure, a method for estimating steering assistance provided by a power steering system of a vehicle may include correlating an internal torque applied by an adaptive steering system of the vehicle with an external torque applied to a steering assembly of the vehicle. The method may also include estimating the steering assistance based on the correlation.

In accordance with various additional exemplary embodiments of the present disclosure, a method for compensating for a change in steering assistance provided by a power steering system of a vehicle may include determining an external torque applied to a steering assembly of the vehicle. The method may also include measuring an internal torque applied to the steering assembly by an adaptive steering system of the vehicle and correlating the external torque with the internal torque. The method may additionally include estimating a change in the steering assistance based on the correlation. The method may further include adjusting the adaptive steering system based on the change.

In accordance with various further exemplary embodiments of the present disclosure, a system for estimating steering assistance provided by a power steering system of a vehicle may include a sensor configured to measure an internal torque applied to a steering assembly of the vehicle by an adaptive steering system of the vehicle. The system may also include an adaptive steering controller communicatively coupled to the sensor. The adaptive steering controller may be configured to correlate the internal torque with an external torque that is applied to the steering assembly and estimate the steering assistance based on the correlation.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages of the present disclosure will be apparent from the following detailed description of exemplary embodiments consistent therewith, which description should be considered with reference to the accompanying drawings, wherein.

Although the following detailed description makes reference to exemplary embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents.

Vehicles with power steering systems lacking internal sensors and electronics, such as, for example, hydraulic power steering systems generally do not have the capability to provide feedback to the vehicle's adaptive steering system regarding the power steering system's status. This may reduce the availability of the adaptive steering system (i.e., its capability to provide an overlay angle). The systems and methods of the present disclosure, however, may be used to estimate the steering assistance provided by a power steering system based, for example, on information that is generated internally by the adaptive steering system and/or other preexisting vehicle information, without the need, for example, of sensors or electronics within the power steering system that can detect such changes. Accordingly, the systems and methods of the present disclosure may be used to detect a change in the steering assistance provided by a hydraulic power steering system. These changes (e.g., degradation) can then be relayed to the adaptive steering system to provide optimal system performance.

Figure 1:
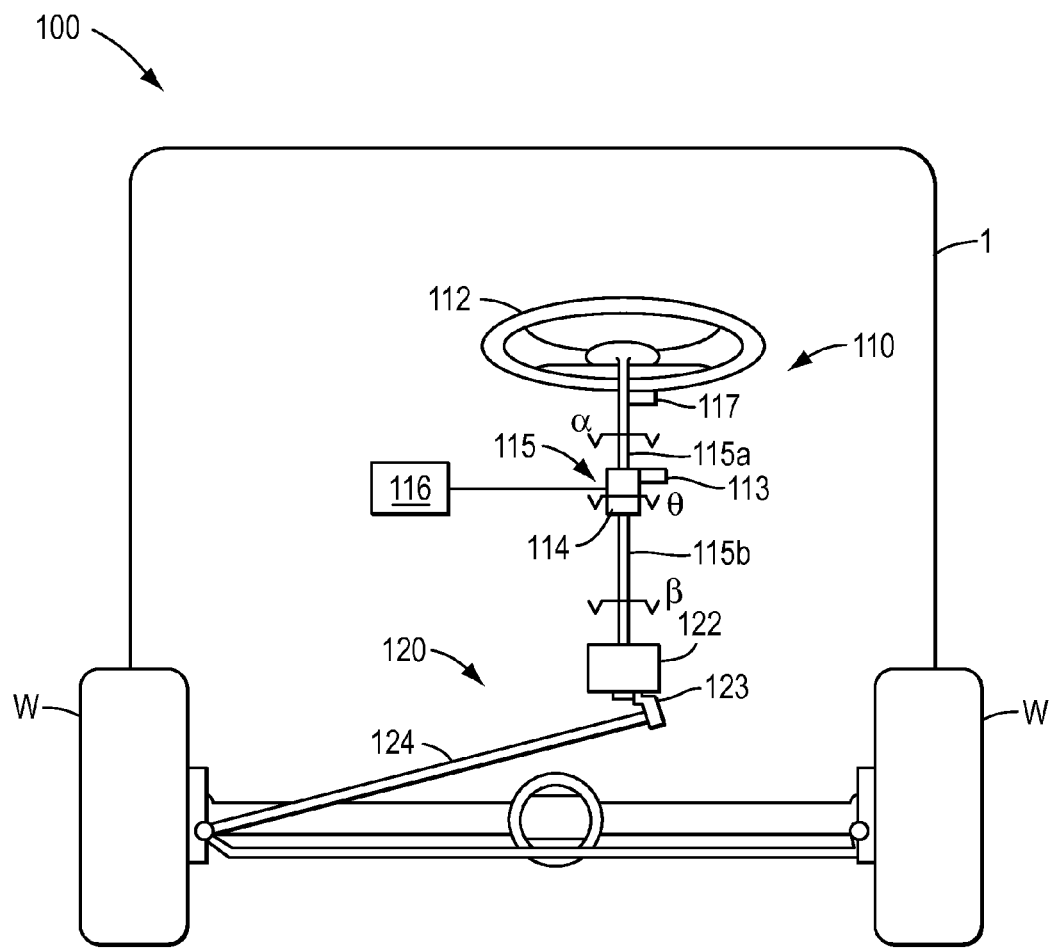
FIG. 1 is a schematic diagram showing the structure of an exemplary embodiment of a system for estimating steering assistance provided by a power steering system in accordance with the present disclosure.

Turning now to the drawings, FIG. 1 shows the structure of an exemplary embodiment of a system 100 for estimating steering assistance provided by a power steering system 120 of a motor vehicle 1. The motor vehicle 1 is equipped with an adaptive steering system, such as, for example, an adaptive front steering (AFS) system (shown by individually labeled components) and a hydraulic power steering system 120.

The vehicle 1 includes a steering assembly 110. The steering assembly 110 includes a steering wheel 112 and an adaptive steering actuator 114 coupled to first and second portions 115a, 115b of a steering column 115. The adaptive steering actuator 114 is communicatively coupled to an adaptive steering controller 116 (which is also communicatively coupled to an actuator angle sensor 113) to form the AFS system of the vehicle 1.

The steering column 115 is also coupled to the hydraulic power steering system 120. The system 120 includes, for example, a gear box 122 coupled via an arm 123 to a rod 124. The gear box 122 receives hydraulic fluid (i.e., power steering fluid) from a power steering pump (not shown), which is turned by the vehicle's engine (not shown). The power steering fluid provides hydraulic assistance to an external torque applied to the steering wheel 112, for example, by a driver of the vehicle 1 (e.g., to help push the rod 124 as the driver turns the steering wheel 112).

In accordance with various exemplary embodiments, the AFS system of the steering assembly 110 is configured to react to vehicle operating parameters by adding an overlay angle $\theta$ to a steering angle $\alpha$ applied by the driver at the steering wheel 112. For example, the driver can supply a torque (an external torque) to turn the steering wheel 112 to a first angle $\alpha$ to change a steering angle of the vehicle's wheels W. The adaptive steering controller 116 may sense one or more vehicle operating parameters and adjust the angle of the wheels W by applying an overlay angle $\theta$ to the steering column 115. In other words, a second angle $\beta$ of the steering column 115 (the angle which is applied to the wheels W) equals the first angle $\alpha$ plus the overlay angle $\theta$ (which is applied by the adaptive steering actuator 114).

To apply the overlay angle $\theta$, the adaptive steering actuator 114 applies an additional torque (an internal torque) to the steering column 115. The total torque in the steering column 115 (the external torque plus the internal torque) may, therefore, be controlled by the adaptive steering controller 116 by controlling a rate of change in the overlay angle $\theta$. The internal torque applied by the adaptive steering actuator 114 may be based, for example, on the one or more vehicle operating parameters, including, but not limited to, vehicle speed, road surface conditions, and the inclination angle of the road surface. However, the internal torque may also depend on the hydraulic assistance provided by the power steering system 120, as explained below.

As above, the hydraulic assistance provided by the power steering system 120 increases the torque applied by the steering column 115 to the gear box 122. To turn the wheels W, the torque applied to the gear box 122 causes the arm 123 to rotate to linearly move the rod 124. In this manner, the hydraulic assistance may apply an additional linear force (via the additional torque applied to the steering column 115) to the end of the rod 124. This linear force extends through the rod 124 to turn the vehicle's wheels W. The magnitude and direction of the linear force is proportional to the external torque applied by the driver to the steering wheel 112, and the proportion is correlated with the amount of hydraulic assistance provided by the power steering system 120.

However, when the hydraulic assistance provided by the power steering system 120 degrades (e.g., due to wear in the power steering pump, a power steering fluid leakage, etc.), the correlation between the linear force and the external torque changes. In effect, more external torque is required to turn the wheels W the same amount under the same vehicle operating conditions. And, the torque needed to apply the required overlay angle increases.

Most conventional hydraulic power steering systems do not, however, have sensors or electronics that can detect a change (e.g., degradation) in the steering assistance provided by the steering system and report that change to the adaptive steering system. Therefore, the adaptive steering controller is never alerted to the amount of degradation (i.e., in the steering assistance) so that it may properly compensate for such degradation. As a result, the overlay angle applied to the steering column may vary in magnitude, velocity, and acceleration as the steering assistance degrades. This variation can lead to a loss of system availability.

The systems and methods in accordance with the present disclosure may, however, estimate a change in the steering assistance provided by the power steering system based on information generated internally by the AFS system and/or other preexisting vehicle information, without the need, for example, of sensors or electronics within the power steering system that can detect such changes. These changes (e.g., degradation) can then be relayed to the AFS system to provide optimal AFS performance. For example, as explained further below, the system 100 may include a sensor 113, such as, for example, an angular position sensor 113, that is configured to measure the internal torque applied to the steering assembly 110 by the AFS system and relay the measured internal torque to the adaptive steering controller 116. The adaptive steering controller is then configured to correlate the internal torque with an external torque that is applied to the steering assembly 110, for example, by the driver of the vehicle 1, and estimate the steering assistance based on the correlation.

Figure 2:
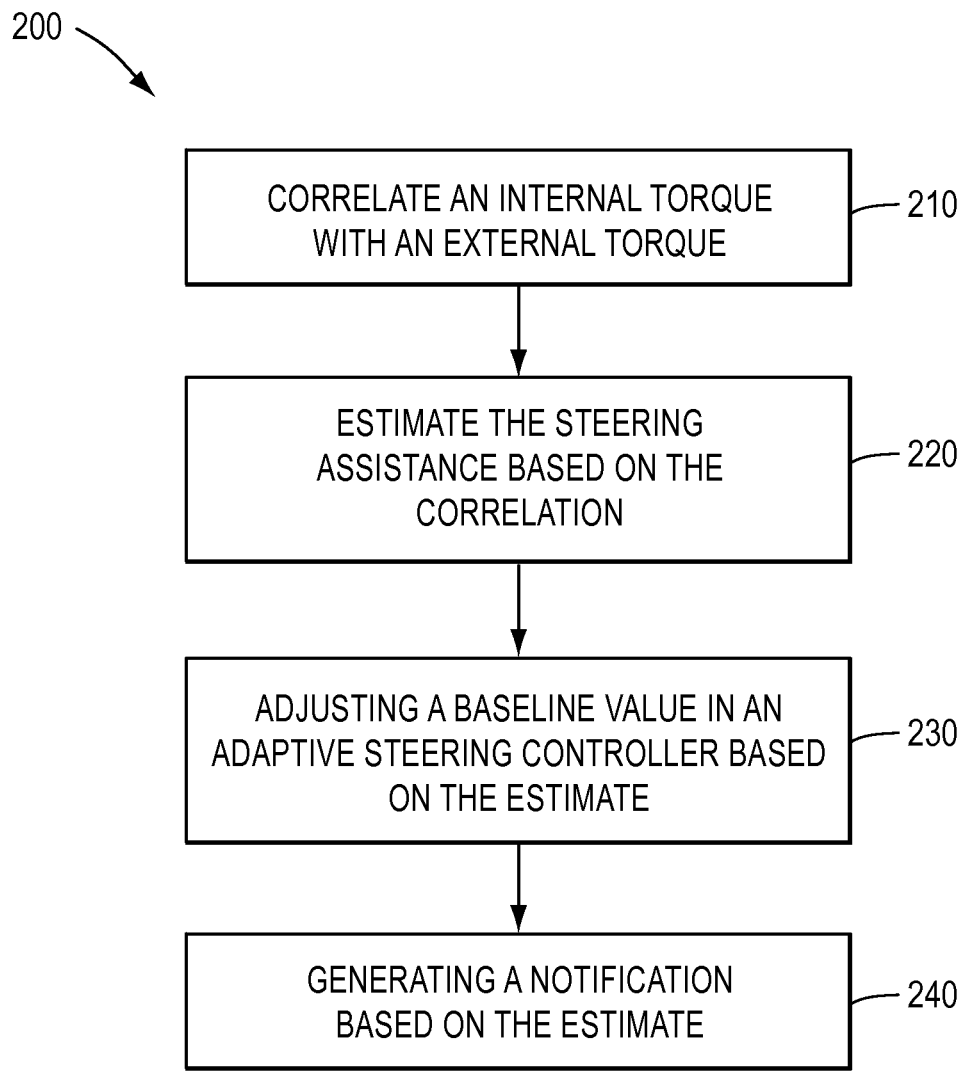
FIG. 2 shows a flow chart illustrating an exemplary embodiment of a method for estimating steering assistance in accordance with the present disclosure.

FIG. 2 shows a flow chart illustrating an exemplary embodiment of a method 200 for estimating steering assistance in accordance with the present disclosure, which is explained with reference to the system 100 of FIG. 1. At step 210, a vehicle controller, such as, for example, the adaptive steering controller 116 may correlate an internal torque applied by the AFS system of the vehicle 1 with an external torque applied to the steering assembly 110 of the vehicle 1. In accordance with various additional embodiments, the controller (i.e., making the correlation) may instead include, various other existing vehicle controllers such as, for example, the Electronic Control Unit (ECU) of the vehicle 1, or a dedicated controller, or control may be distributed among more than one vehicle controller, as would be understood by one ordinarily skilled in the art.

As above, in accordance with various exemplary embodiments, the internal torque may be the torque applied by the adaptive steering actuator 114 to the steering assembly 110. In other words, the internal torque may be considered to be the amount of torque applied by the adaptive steering actuator to the steering column 115 to generate the overlay angle θ. And, the external torque may be the torque applied by the driver to the steering wheel 112, or the amount of torque applied by the driver to turn the steering wheel 112 by the angle α.

In accordance with various exemplary embodiments, the internal torque may be measured via an AFS sensor, such as, for example, an angular position sensor 113, and the external torque may be determined via adaptive steering sensors, including, for example, a steering wheel angle sensor 117. Because most existing vehicles already contain the above sensors, certain embodiments of the present disclosure contemplate using only existing vehicle sensors. Embodiments of the present disclosure also contemplate systems and methods that include and utilize additional sensors as needed to provide the signal inputs and data used in the systems and methods of the present disclosure. Furthermore, it would be understood that both the internal and external torque can be measured, determined, and/or calculated using any known methods and/or techniques using various types and/or combinations of sensors.

At step 220, the controller 116 estimates a steering assistance based on the correlation. The torque in the steering column may, for example, increase as the steering assistance provided by the hydraulic power steering system 120 degrades. Accordingly, the controller 116 can estimate the steering assistance by employing the correlation between the internal torque and the external torque. In other words, the estimated steering assistance may be a magnitude of the linear force applied to the rod 124, the hydraulic pressure of the fluid provided by the power steering pump, or the like. The estimated steering assistance can also be an estimate of a change in the steering assistance provided by the power steering system 120. For example, a percentage (e.g., 95%) of the non-degraded steering assistance may be estimated. In accordance with various embodiments, for example, when certain conditions are met, a rolling average can be calculated and compared to a premeasured value of steering assistance to determine the health of the power steering system 120.

In this manner, the adaptive steering controller 116 is alerted to the change so that it may properly compensate for the change (e.g., by having the actuator 114 provide more internal torque to produce the required overlay angle θ when the system is under the maximum possible torque of the adaptive steering system). At step 230, for example, the controller 116 adjusts the AFS system to compensate for the estimated change by adjusting a baseline value stored, for example, in a memory of the controller 116 based on the estimated change. The adjusted baseline value is then used to generate a new overlay angle θ. In other words, the difference between the desired overlay angle θ and the actual overlay angle θ may be used to calculate the required internal torque. This correction value may then be added to the initial torque request to provide for more consistent operation of the adaptive steering system.

In accordance with various additional embodiments, the estimated change can also be used to inform other vehicle modules, such as, for example, the engine or sensor cluster, and/or to inform the driver about the state of the power assisted steering system 120. At step 240, for example, the controller 116 may provide feedback by generating a notification to the driver, dealer, and/or other service provider when, for example, the estimated change exceeds a given threshold.

In various embodiments, for example, the controller 116 may send a notification to a notification system (not shown) when the estimated change exceeds the threshold. The notification system can, for example, audibly and/or visually indicate to the driver that the power steering system 120 needs to be checked and/or serviced. As would be understood by those of ordinary skill in the art, the notification system can include, for example, an indicator light or LCD that is displayed on the vehicle's console, rearview mirror, or other location noticeable to a driver. The indicator light or LCD can be, for example, constant or blinking, can be displayed only at startup or displayed continuously throughout the vehicle's use, and can be accompanied by a sound to further aid in alerting the driver to issue. The present disclosure further contemplates a notification system that also or alternatively alerts a dealer or mechanic that the power steering system needs to be checked and/or serviced, such as, for example, by storing a diagnostic trouble code that is accessed at the time of service and/or by transmitting a trouble code to a dealer or mechanic prior to the time of service. With this information, the service provider can contact the vehicle's owner regarding the need for service, or suggest that the power steering system be inspected the next time the vehicle is in for service. The notification system can be, for example, wireless within the vehicle and/or between the vehicle and the service provider.

The method 200 described above, therefore, does not require sensors or other electronics within the power steering system 120 to detect a change in the steering assistance provided, but may use preexisting vehicle sensors and/or other available vehicle information to estimate the change. As a result, the steering assistance can be compensated for by, for example, the adaptive steering actuator 114 without costs associated with additional parts.

Figure 3:
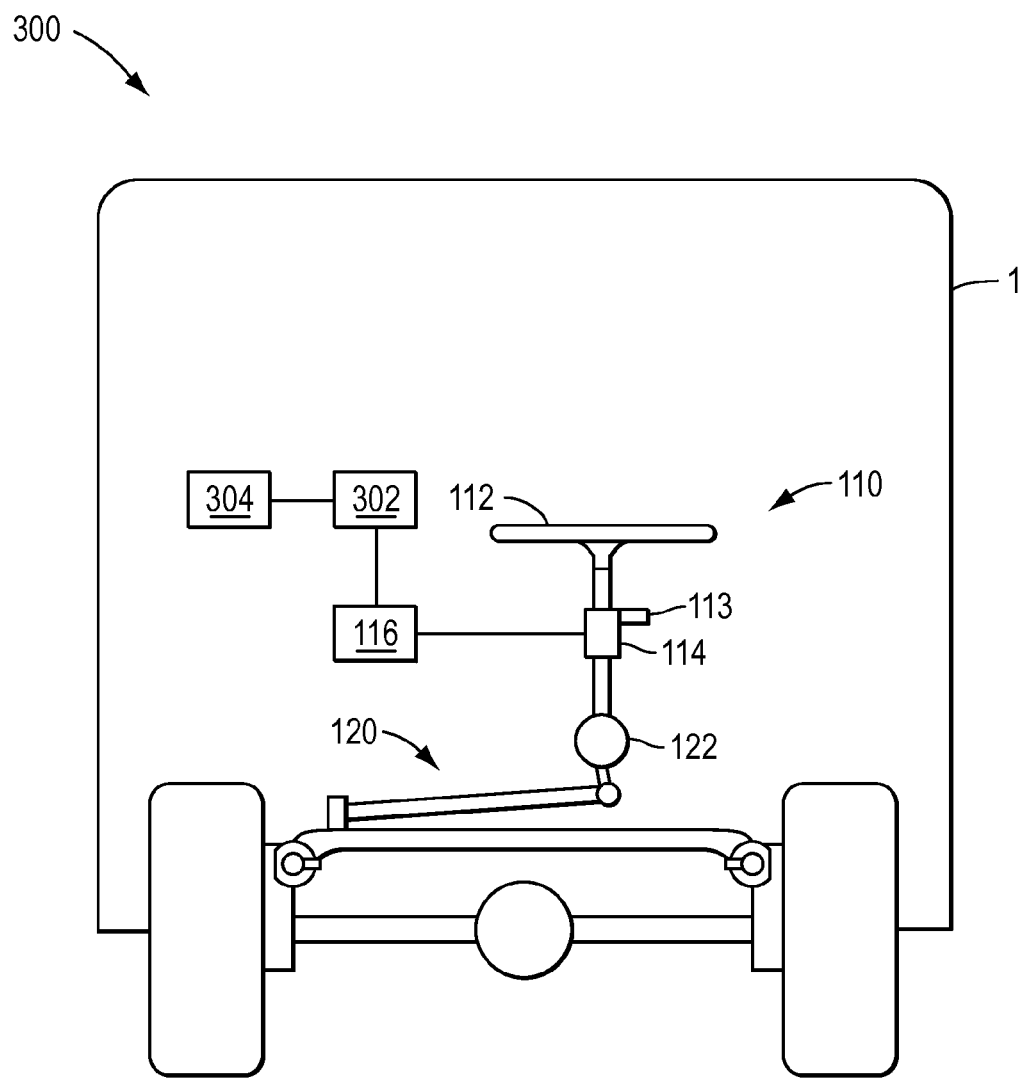
FIG. 3 is a schematic diagram showing the structure of another exemplary embodiment of a system for estimating steering assistance provided by a power steering system in accordance with the present disclosure.

As would be understood by those of ordinary skill, however, the method 200 and the system 100 to which it relates, which are illustrated and described with reference to FIGS. 1 and 2, are exemplary only. And, as will be explained in more detail below, the internal torque and the external torque can be correlated using various additional methods, incorporating various additional systems, using various additional components and sensors, without departing from the scope of the present disclosure and claims In various exemplary embodiments, for example, the correlation can be estimated with a vehicle operating model. FIG. 3 shows the structure of another exemplary embodiment of a system 300 for estimating steering assistance provided by the power steering system 120 of the motor vehicle 1. As above, the vehicle 1 includes a steering assembly 110, including an AFS system, and a hydraulic power steering system 120. The vehicle 1 also includes a steering wheel 112, an adaptive steering actuator 114, an adaptive steering controller 116, and a gear box 122. Similar to the system 100, the system 300 includes a sensor, such as, for example, an angular position sensor 113, that is configured to measure the internal torque applied to the steering assembly 110 by the AFS system and relay the measured internal torque to the adaptive steering controller 116. As described further below, the system 300, however, also includes a control module 302 that is communicatively coupled to sensors 304 and the adaptive steering controller 116. In accordance with various embodiments, the sensors 304 may include, but are not limited to, pressure sensors, strain gauges, and/or position sensors.

As would be understood by those of ordinary skill in the art, the control module 302 may be any suitable processor and/or memory capable of transmitting and receiving signals. The control module 302 can, for example, include a processor and memory configured to store and process information related to a model of the vehicle. For example, the control module 302 can store a model of the vehicle that can be used to calculate values based on one or more vehicle operating conditions obtained from the sensors 304. The control module 302 may also, for example, transmit signals to the adaptive steering controller 116 carrying information related to an estimated steering assistance.

Figure 4:
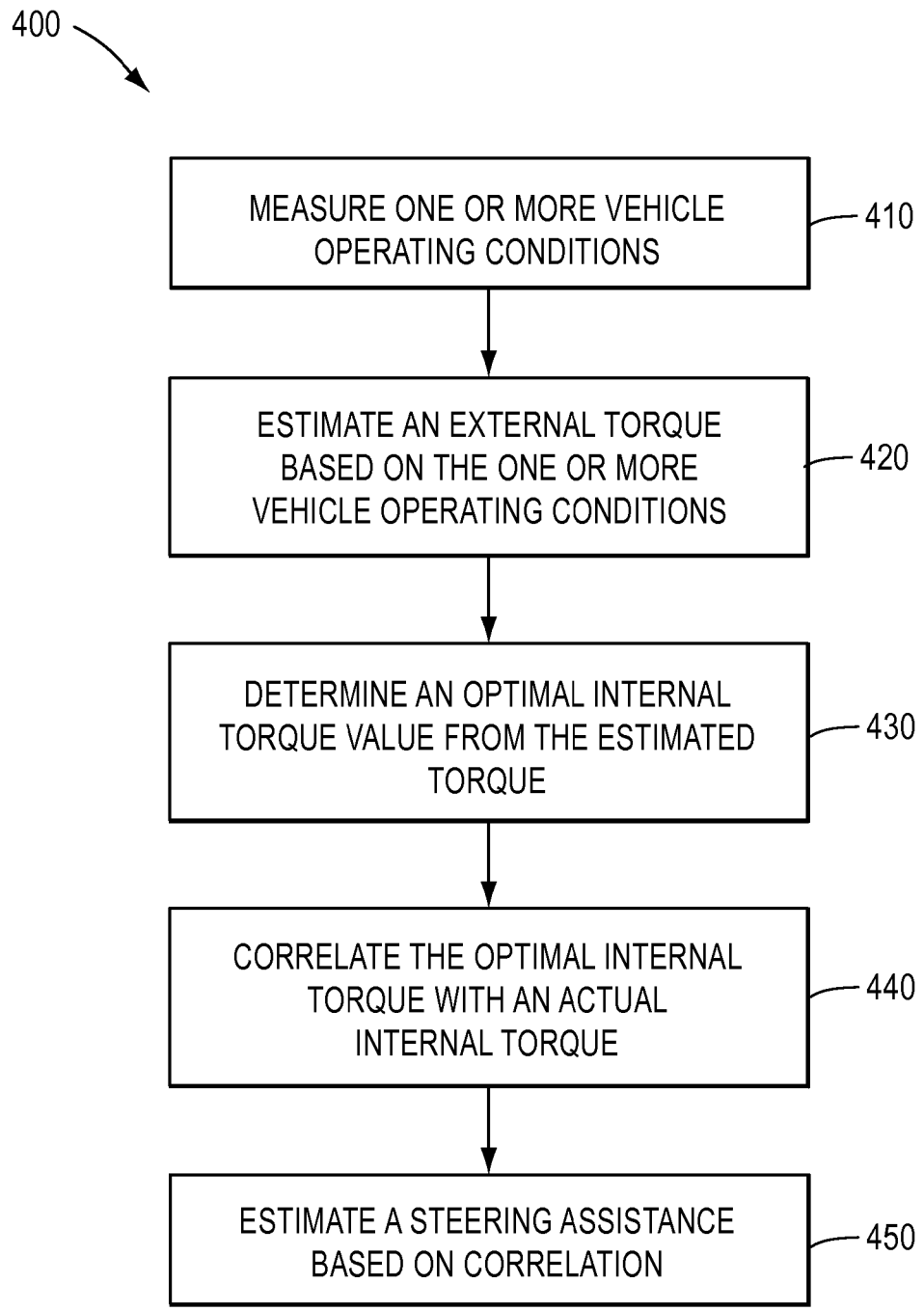
FIG. 4 shows a flow chart illustrating an exemplary embodiment of another method for estimating steering assistance in accordance with the present disclosure.

FIG. 4 shows a flow chart illustrating an exemplary embodiment of a method 400 for estimating steering assistance in accordance with the present disclosure, which is explained with reference to the system 300 of FIG. 3. At step 410, the control module 302 measures one or more vehicle operating conditions. The one or more vehicle operating conditions may include, but are not limited to, vehicle speed, steering angle, vehicle body angles (e.g., yaw, pitch, roll, etc.), engine output, and/or transmission gearing. The one or more vehicle operating conditions may be measured directly via sensors 304, or may be measured indirectly by performing signal conditioning and/or processing on one or more signals from the sensors 304.

At step 420, the control module 302 estimates an external torque based on the one or more vehicle operating conditions. In various embodiments, for example, the module 302 may estimate the external torque by employing a model of the vehicle. The model may have characteristics related to the vehicle 1's suspension system, engine, steering assembly 110, body, frame, etc. Accordingly, the model may accept inputs, which include the one or more vehicle operating conditions, and output an estimate of the external torque. The estimated external torque can then be relayed (e.g., by the control module 302) to the adaptive steering controller 116.

At step 430, an optimal internal torque value is determined from the estimated external torque. In other words, the adaptive steering controller 116 may employ the estimated external torque to calculate a torque value that would normally be applied to the steering assembly 110 by the adaptive steering actuator 114 if the steering assistance is not degraded.

At step 440, the adaptive steering controller 116 measures the actual internal torque applied by the adaptive steering actuator 114 to the steering assembly 110 via, for example, the angular position sensor 113, and correlates the actual internal torque with the optimal internal torque.

At step 450, a steering assistance is estimated based on this correlation. For example, if the actual torque is greater than the optimal torque value, then the steering assistance may be degraded. However, if the actual torque is substantially the same as the optimal torque value, then the steering assistance is likely not degraded.

Figure 5:
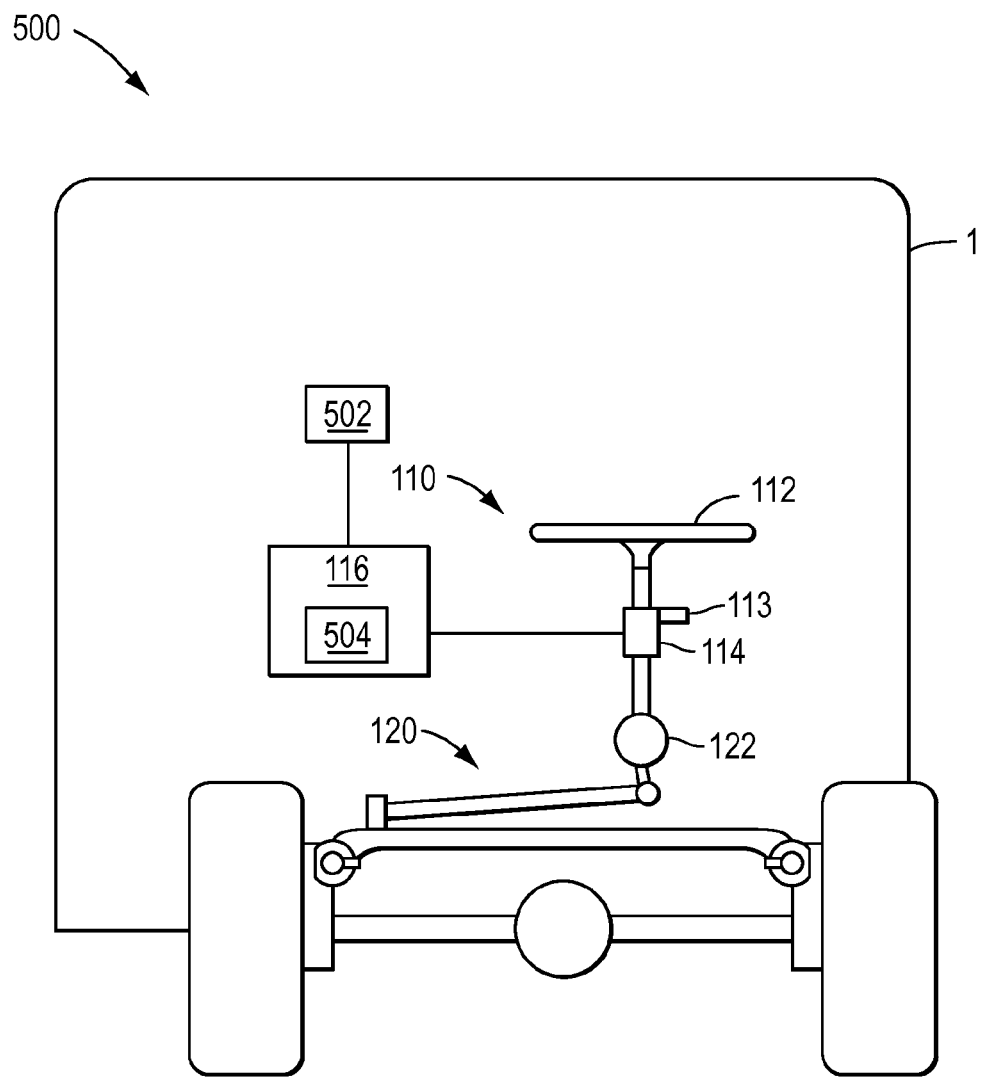
FIG. 5 is a schematic diagram showing the structure of yet another exemplary embodiment of a system for estimating steering assistance provided by a power steering system in accordance with the present disclosure.

In various additional embodiments, the correlation can be estimated using previous measurements of the external torque and the internal torque. FIG. 5, for example, shows the structure of yet another exemplary embodiment of a system 500 for estimating steering assistance provided by the power steering system 120 of the motor vehicle 1. As above, the vehicle 1 includes a steering assembly 110, including an AFS system, and a hydraulic power steering system 120. The vehicle 1 also includes a steering wheel 112, an adaptive steering actuator 114, an adaptive steering controller 116, and a gear box 122. Similar to the systems 100 and 300, the system 500 includes a sensor, such as, for example, an actuator angle sensor 113, that is configured to measure the internal torque applied to the steering assembly 110 by the AFS system and relay the measured internal torque to the adaptive steering controller 116. As described further below, the system 500, however, also includes a control module 502 that is communicatively coupled to the adaptive steering controller 116, and the adaptive steering controller 116 may include stored torque values 504.

As would be understood by those of ordinary skill in the art, the control module 502 may be any appropriate process and/or memory configured to communicate with the adaptive steering controller 116. For example, the adaptive steering controller 116 may provide the stored torque values 504 to the control module 502 so that the control module 502 may perform calculations related to estimating the steering assistance. In accordance with various additional exemplary embodiments, the adaptive steering controller may itself perform the calculations to estimate the steering assistance without need for a secondary control module 502.

The stored torque values 504 may, for example, be previously determined torque values that are stored, for example, in a memory associated with the adaptive steering controller 116. In accordance with various embodiments, for example, an external torque sensor (not shown) can be coupled to the steering assembly 110 to measure the external torque applied by the driver to the steering wheel 112. An external torque can then be measured by the sensor while an internal torque (i.e., which is applied by the adaptive steering actuator 114 to the steering assembly 110) is also measured, for example, by the sensor 113. The external torque and the internal torque may be measured; for example, with varying levels of steering assistance (e.g., full, half, and/or no assist). Accordingly, the external torque and the internal torque may be correlated with the various levels of steering assistance to produce various predetermined torque values 504, which are stored by the controller 116.

Figure 6:
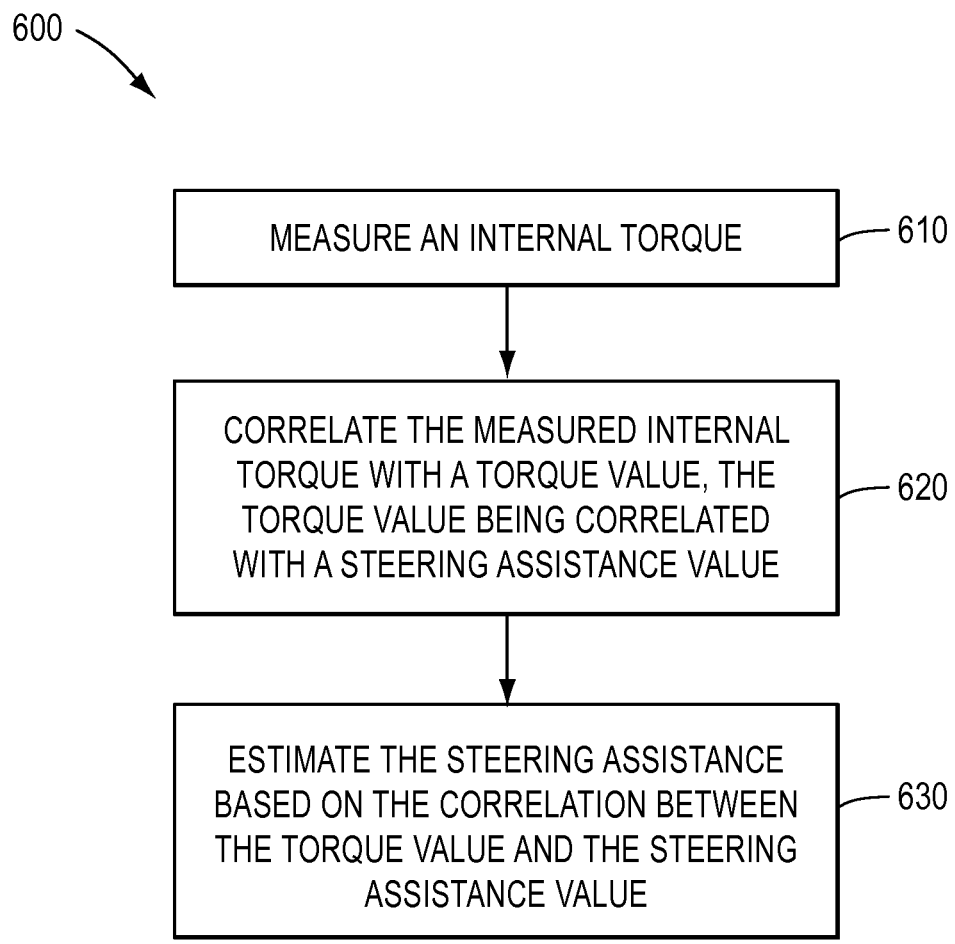
FIG. 6 shows a flow chart illustrating an exemplary embodiment of yet another method for estimating steering assistance in accordance with the present disclosure.

FIG. 6 shows a flow chart illustrating an exemplary embodiment of a method 600 for estimating steering assistance in accordance with the present disclosure, which is explained with reference to the system 500 of FIG. 5. At step 610, a sensor, such as, for example, an angular position sensor 113 measures the internal torque provided by the adaptive steering actuator 114. As would be understood by those of ordinary skill in the art, the internal torque may be measured with various sensors, and/or using any known method or technique. For example, in various additional embodiments, a sensor may measure the current provided to a stator in the adaptive steering actuator 114 so that the controller 116 may determine the torque applied by the adaptive steering actuator 114.

At step 620, the control module 502 correlates the measured internal torque with a torque value 504. As explained above, the torque value 504 may be a previously determined value obtained by measuring an external torque at the same time as an internal torque, with a known degradation in steering assistance.

At step 630, the control module 502 estimates a steering assistance based on the correlation between the torque value and a steering assistance value (i.e., the level of steering assistance (e.g., full, half, and/or no assist) associated with the value). For example, when the torque value is correlated to a steering assistance value corresponding to a degraded assist, the control module 502 can determine that the steering assistance is degraded, as well as the approximate magnitude of the degradation.

The methods described above can be performed in one or more devices of the vehicle. For example, the methods can be performed by a control device of an adaptive steering system (e.g., an AFS system) such as a central control unit or controller 116. The control device can be implemented within any element of the AFS system such as a control unit. Alternatively, the control device can be a separate device from any of the above-described AFS system elements. The control device can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. The control device can further include a processing element such as a microprocessor or other circuitry to retrieve and execute software from the storage element. The control device can also comprise other components such as a power management unit, a control interface unit, etc.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

While the present disclosure has been disclosed in terms of exemplary embodiments in order to facilitate better understanding of the present disclosure, it should be appreciated that the present disclosure can be embodied in various ways without departing from the principle of the disclosure. Accordingly, while the present disclosure has been disclosed in terms of using an AFS system with a single controller, the disclosure as disclosed works equally well for various quantities and types of controllers and/or microprocessors. Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present disclosure. It is to be understood that the various embodiments shown and described herein are to be taken as exemplary. Elements and materials, and arrangements of those elements and materials, may be substituted for those illustrated and described herein, parts and processes may be reversed, and certain features of the present disclosure may be utilized independently, all as would be apparent to one skilled in the art after having the benefit of the description herein. Changes may be made in the elements described herein without departing from the spirit and scope of the present disclosure and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

What is claimed is:

1. A method for estimating steering assistance provided by a power steering system of a vehicle, comprising:
   with a controller of the vehicle:
   correlating an internal torque applied to a steering assembly of the vehicle by an adaptive steering system of the vehicle with an external torque applied to the steering assembly by an external source; and
   estimating the steering assistance provided by the power steering system based on the correlation.

2. The method of claim 1, wherein the internal torque is applied to the steering assembly by an adaptive steering actuator of the adaptive steering system.

3. The method of claim 1, wherein the external torque is an applied torque by a driver of the vehicle.

4. The method of claim 1, wherein the external torque is an estimated torque based on one or more vehicle operating parameters.

5. The method of claim 1, wherein the external torque is a stored torque based on a previously measured external torque.

6. The method of claim 1, wherein correlating the internal torque with the external torque comprises estimating the external torque and determining an optimal internal torque value from the estimated external torque.

7. The method of claim 1, wherein correlating the internal torque with the external torque comprises measuring the internal torque applied by the adaptive steering system and comparing the measured internal torque with a predetermined torque value.

8. The method of claim 1, wherein estimating the steering assistance comprises estimating a change in the steering assistance provided by the power steering system.

9. The method of claim 8, further comprising adjusting a baseline value in an adaptive steering controller based on the change in the steering assistance.

10. The method of claim 8, further comprising generating a notification if the estimated change indicates that the power steering system needs to be serviced.

11. The method of claim 8, wherein estimating the change in the steering assistance provided by the power steering system comprises estimating an amount of degradation in the steering assistance provided by the power steering system.

12. The method of claim 1, wherein estimating the steering assistance provided by the power steering system comprises estimating the steering assistance provided by a hydraulic power steering system.

13. A method of compensating for a change in steering assistance provided by a power steering system of a vehicle, comprising:
    determining, with a controller of the vehicle, an external torque applied to a steering assembly of the vehicle by an external source;
    measuring, with a sensor communicatively coupled to the controller, an internal torque applied to the steering assembly by an adaptive steering system of the vehicle; and
    correlating the external torque with the internal torque with the controller;
    estimating a change in the steering assistance provided by the power steering system based on the correlation; and
    adjusting the adaptive steering system based on the change.

14. The method of claim 13, wherein determining the external torque comprises measuring a torque applied by a driver of the vehicle.

15. The method of claim 13, wherein determining the external torque comprises estimating a torque based on one or more vehicle operating parameters.

16. The method of claim 13, wherein determining the external torque comprises accessing a previously measured external torque.

17. The method of claim 13, wherein measuring the internal torque comprises measuring a torque applied by an adaptive steering actuator of the adaptive steering system.

18. The method of claim 17, wherein adjusting the adaptive steering system comprises adjusting a baseline value in an adaptive steering controller that controls the torque applied by the adaptive steering actuator.

19. A system for estimating steering assistance provided by a power steering system of a vehicle, comprising:
    a sensor configured to measure an internal torque applied to a steering assembly of the vehicle by an adaptive steering system of the vehicle; and
    an adaptive steering controller communicatively coupled to the sensor,
    wherein the adaptive steering controller is configured to correlate the internal torque with an external torque that is applied to the steering assembly by an external source and estimate the steering assistance provided by the power steering system based on the correlation.

20. The method of claim 13, further comprising generating a notification if the estimated change indicates that the power steering system needs to be serviced.

21. The method of claim 13, wherein estimating the change in the steering assistance provided by the power steering system comprises estimating an amount of degradation in the steering assistance provided by the power steering system.

22. The method of claim 13, wherein estimating the change in the steering assistance provided by the power steering system comprises estimating the change in the steering assistance provided by a hydraulic power steering system.

23. The system of claim 19, wherein the adaptive steering controller is further configured to adjust a baseline value based on the estimated steering assistance, wherein the baseline value is used by the adaptive steering controller to control a torque applied to the steering assembly by an adaptive steering actuator.

24. The system of claim 23, wherein the adaptive steering controller is configured to estimate an amount of degradation in the steering assistance provided by the power steering system.

25. The system of claim 23, wherein the power steering system is a hydraulic power steering system.

* * * * *